United States Patent [19]

Lemelson

[11] 3,827,667

[45] Aug. 6, 1974

[54] COMPOSITE MOLD WALL STRUCTURE

[76] Inventor: Jerome H. Lemelson, 85 Rector St., Metuchen, N.J. 08840

[22] Filed: Oct. 24, 1972

[21] Appl. No.: 300,299

Related U.S. Application Data

[63] Continuation of Ser. No. 53,833, July 10, 1970, abandoned, and a continuation-in-part of Ser. No. 601,259, Nov. 1, 1966, Pat. No. 3,529,987, and a continuation-in-part of Ser. Nos. 432,033, Nov. 25, 1964, Pat. No. 3,414,863, and Ser. No. 432,924, Jan. 8, 1965, Pat. No. 3,346,220, and a continuation-in-part of Ser. No. 641,101, Feb. 19, 1957, Pat. No. 3,173,195, and a continuation-in-part of Ser. No. 734,340, May 9, 1958, Pat. No. 3,173,175.

[52] U.S. Cl..................... 249/80, 249/135, 425/175
[51] Int. Cl........................................... B22d 27/04
[58] Field of Search......... 425/80, 109, 130, 4, 175; 249/80, 116, 135, 114; 264/45, 219, 226

[56] References Cited
UNITED STATES PATENTS

| | | | |
|---|---|---|---|
| 1,615,086 | 1/1927 | Junker | 249/80 |
| 1,796,853 | 3/1931 | McMullan | 249/80 |
| 2,174,425 | 9/1939 | Schlumbohm | 249/135 UX |
| 2,272,930 | 2/1942 | Black | 249/80 X |
| 2,317,597 | 4/1943 | Ford et al. | 425/175 X |
| 2,336,578 | 12/1943 | Skoning | 249/135 X |
| 2,579,898 | 12/1951 | Brecker | 249/80 |

FOREIGN PATENTS OR APPLICATIONS 1,103,991   6/1955   France..................... 249/80

Primary Examiner—Robert L. Spicer, Jr.

[57] ABSTRACT

Composite structures are provided in the construction of heat transfer panels such as utilized in the making of large molds for producing articles of manufacture in molding cavities thereof wherein heat is transferred to and/or from the molding material during the molding process. The constructions involve the use of a relatively thin metal sheet or panel in combination with a bulk material such as ceramic material forming the major portion of the mold structure and providing support for the sheet material. Constructions are provided in which a heat transfer passageway is formed within or between the sheet material and the backup material through which heat transfer fluid may be flowed. The invention also consists of simple methods for forming the heat transfer molds.

10 Claims, 11 Drawing Figures

INVENTOR.
JEROME H. LEMELSON

INVENTOR.
JEROME H. LEMELSON

COMPOSITE MOLD WALL STRUCTURE

RELATED APPLICATIONS

This is a continuation of Ser. No. 53,833 filed July 10, 1970, now abandoned and a continuation-in-part of Ser. No. 601,259 filed Nov. 1, 1966, now U.S. Pat. No. 3,529,987, as a continuation-in-part of Ser. No. 432,033 filed Nov. 25, 1964, now U.S. Pat. No. 3,414,863, and Ser. No. 432,924 filed Jan. 8, 1965, now U.S. Pat. No. 3,346,220 having as a parent application Ser. No. 641,101 filed Feb. 19, 1957, now U.S. Pat. No. 3,173,195. The invention filed herein, as set forth in parent application Ser. No. 53,833 is also found in parent application Ser. No. 734,340 filed May 9, 1958, now U.S. Pat. No. 3,173,175.

SUMMARY OF THE INVENTION

This invention relates to improvements in the construction of heat transfer structures, particularly as applies to mold and furnace walls, and methods for producing such structures.

Metal and ceramic panels have been utilized for the walls of various structures such as molds, ovens, and other enclosures including the bodies of vehicles and equipment exposed to ambient extreme changes or variations in temperature. Most of the panel structures of the prior art utilized for heat transfer purposes are relatively complex assemblies requiring many fabricating operations and hence, are relatively costly to fabricate and difficult to maintain.

The composite structures defined by the instant invention are produced, at least in part, by depositing one or more materials, including insulating materials, on a substrate to form portions of the composite structure which may serve as insulation and/or the major support therefore. By employing the techniques defined herein, substantial reductions may be realized in the cost of producing said structures, as well as improvements in the structures themselves. Accordingly, it is a primary object of this invention to provide a new and improved composite structure in a heat transfer panel and a method for producing same.

Another object is to provide a new and improved heat transfer panel which may be utilized for either heating a fluid environment adjacent to the panel or receiving heat from said environment.

Another object is to provide new and improved structures in paneling containing fluid conducts with means for transfering heat relative to the fluid in the conduit.

Another object is to provide a new and improved structure in a tube or pipe and means for heating same during the conduction of fluid therethrough which may congeal or solidify if the temperature thereof drops.

Another object is to provide a new and improved heat transfer panel having a plurality of wall components including a relatively thin sheet of metal operative to receive the heat of the process secured to a substantially thicker wall material which is relatively inexpensive and easy to combine with said metal.

Another object is to provide a heat transfer panel or wall structure, the major portion of which is made of a non-metallic material such as a ceramic or mortar yet which may be utilized to rapidly dissipate heat applied to a metallic portion thereof.

With the above and such other objects in view which may hereafter more fully appear, the invention consists of the novel constructions, combinations and arrangements of parts as will be fully described and illustrated in the accompanying drawings but it is to be understood that changes, variations and modifications may be resorted to which fall within the scope of the invention as claimed.

Figure 1:
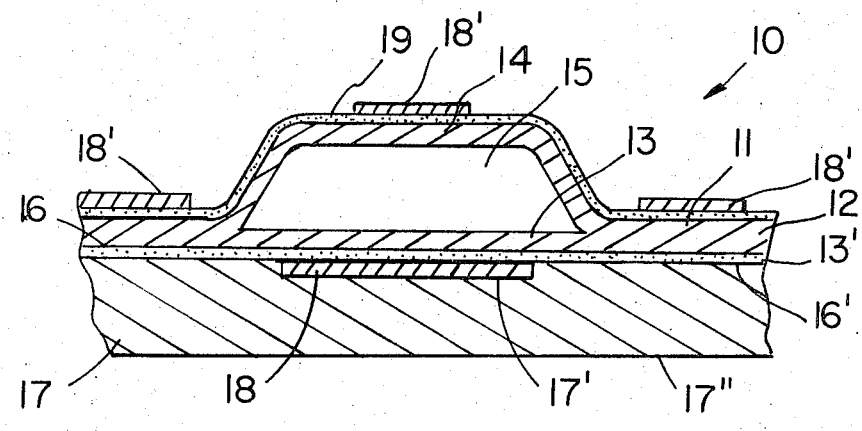
FIG. 1 is an end view in cross-section of a fragment of a heat transfer panel made in accordance with the teachings of this invention.

There is shown in FIG. 1 a heat transfer panel 10 comprising a composite assembly of a ducted panel 11 and a plurality of layers 16 and 17 of materials to be described which are integrally bonded or welded together in sandwich assembly with the panel 11. The ducted panel 11 may be made in accordance with the teachings of my said copending application wherein a pattern of stop-weld material is disposed on a first sheet of metal such as aluminum which sheet is thereafter hot rolled against a second metal sheet in a manner to weld the two sheets together save in the area covered by the stop-weld material which defines a strip-like volume which is capable of being expanded to form one or more conduit formations, such as 14, which may be utilized for conducting heat transfer liquid. In another technique, the incorporation of strips of friable material into a metal billet to be rolled into sheet form results in the provision of flat, non-welded strip-like interfacial volumes in the eventually rolled sheet which volumes may be expanded by fluid presure to form the duct or conduit therein. Reference is made to u.S. Pat. No. 3,098,290 and to my copending application Ser. No. 641,101 for techniques for manufacturing a panel having one side flat and one or more conduit formations extending from the other face such as the panel member 11 of FIG. 1. Other methods may also be provided for forming panels of the type illustrated and defined by notation 11 including deforming a first sheet of metal and pressure welding or otherwise bonding said sheet to a second flat sheet.

Notation 12 refers to that portion of panel 11 disposed between deformed conduit portions 14 and notation 13 refers to that portion of the panel 11 which is flat and defines a wall of the passageway 15 in the conduit portion 14 of the panel.

After the ducted panel or sheet 11 is formed, a coating or sheet 16 of ceramic material such as porcelain, Pyroceram cement or other suitable insulating material is fused or bonded to the rear face 13' of 11 and preferably set and fused thereagainst by heat applied thereto.

Illustrated in FIG. 1 is a strip 18 of electrically conducting material such as a resistance heating element shown disposed against the rear face 16' of layer 16 of insulating material and in alignment with the conduit formation 14. The strip or bar element 18 may be formed directly on surface 16' of layer 16 by deposition or may be provided as a separate strip bonded thereto by means of a suitable ceramic adhesive or during the fusion and solidification process when the layer 16 is fired or heated. Such strip 18 may be provided in the desired contour or pattern so as to follow the conduit formation 14 throughout the sheet or may be disposed across or longitudinal to only selected portions of said conduit. Conversely, the element 18 may be metal such as copper utilized to carry high voltages operative to heat same while the heat transfer fluid carried in the volume 15 of the conduit formed in sheet 11 may be utilized to transfer heat from the element 18 during its operation so as to maintain its temperature constant.

Notation 17 refers to insulating material which has been preformed as a panel or is deposited on the lower surface 16' of layer 16 over the resistance heating element 18 and bonded or heat fused in sandwich assembly to the surfaces of insulating layer 16 and element 18. The material comprising layer 17 may be the same material comprising layer 16 or a different material deposited thereon or previously formed and abutted thereagainst.

A further layer 19 of insulating material is also shown disposed against the upper surface 11' of the panel or sheet 11 and is operative to protect same from heat corrosion or erosion, chemical attack, etc.

The member or layer 17 may also comprise a structural member, plate or sheet of any suitable material which has been rolled, cast, machined, forged or extruded to its desired shape and forms the load bearing portion or wall of an article of manufacture such as a furnace, mold or vehicle containing the ducted panel 11 in assembly therewith which panel is utilized for heat transfer purposes. If the resistance heating element or conductor 18 is utilized in such a structure in which the layer 17 is made of metal, said element 18 may be insulated from metal member 17 by a suitable insulating material such as that comprising the layer 16 disposed between 18 and the surface or surfaces of 17 aligned with element 18. Conducting element 18 may be deposited or bonded within a recess or channel 17' provided in member or layer 17 as illustrated or deposited on a layer of insulating material (not shown in FIG. 1) disposed between element 18 and 17 on the flat upper surface of metal panel portion 17.

Other variations in the panel structure illustrated in FIG. 1 include the provision of one or more strips of conductors or resistance heating elements such as 18 embedded within the layer or plate 17 or disposed on the lower surface 17'' thereof or within the insulating layer 16 or against the outer surface of panel 11. Notation 18' refers to strips of metal or resistance heating material bonded to the outer surface of the insulating layer 19 which coats the outer surface 11' of panel 11. Such strips 18 are shown disposed adjacent to the conduit portion 14 although they may also be provided on the insulating material coating said conduit portion.

Figure 2:
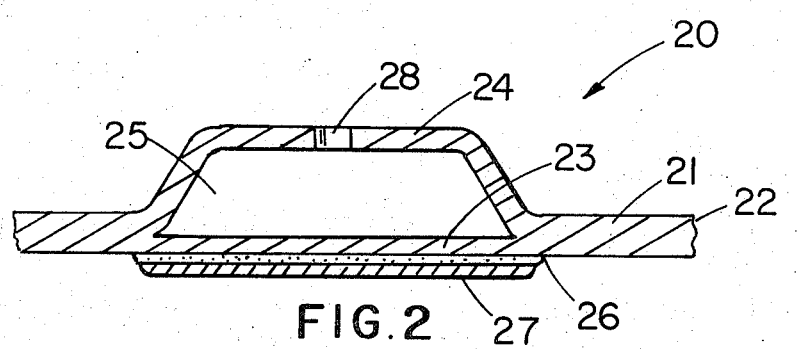
FIG. 2 is an end view of a modified form of the panel, in cross-section, made of composite material showing means for electrically heating fluid carried by the panel and means for dispensing said fluid.

In FIG. 2 is shown a panel structure 20 including a ducted panel 21 of the type provided in FIG. 1 defined by portions 22 comprising a flat sheet of metal and conduit portions 24 formed by inflating or otherwise deforming portions of the sheet 21 and defining one or more passageways 25 in the sheet. The passageway 25 is shown having a flat wall 23 adjacent the deformed wall 24 of the conduit. Coating the outside surface of flat wall 23 is an insulating material 26 and integrally bonded to the outer surface of 26 is a conductor strip 27 such as a resistance heating element. Provided along wall 24 are a plurality of through and through holes 28 which may be utilized for flowing a liquid or gas pumped through the passageway 25 into the volume immediately surrounding the panel 20 for heat transfer or other purposes. For example, the assembly 20 may be utilized as a wall panel or part of a wall panel, radiator or the like for heating a room. If the strip member 27 is an electrical resistance heating element which extends for a substantial distance along the length of the conduit 24 and is electrically energized, it may be utilized to heat a fluid such as air blown or pumped through the passageway 25 so that upon ejecting said heated air through the plurality of holes or slots 28 in wall 24, it may be utilized for heating the surrounding air and to maintain same at a desired temperature. The panel assembly 20 of FIG. 2 may also be utilized for heating other assemblies to which it is secured such as composite panel members having one or more plates or sheets fastened to either or both sides of the assembly 20. If a cold liquid or gas is pumped through passageway 25, it may be utilized for cooling the atmoshere or a member disposed adjacent thereto by flow of said coolant fluid through the plurality of openings 28. Hot liquid pumped through passageway 25 may also be sprayed through openings 28 for heating the surrounding atmopshere or structures, or the panel 20 may be utilized as a component of a manufacturing apparatus such as a chemical apparatus whereby one or more passageways of the type illustrated may be provided for introducing, mixing and heating or cooling different liquids and/or gases.

Certain features of the structure illustrated in FIG. 1 may be combined with that in FIG. 2 as may features of the structure 20 of FIG. 2 be combined with that of FIG. 1 without departing from the spirit of the invention.

Figure 3:
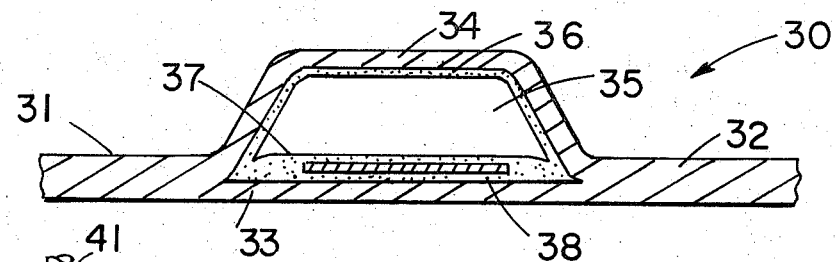
FIG. 3 is a cross-sectional view of a modified form of ducted panel in the realm of the invention.

FIG. 3 illustrates another form of the invention in which an electrical conducting strip 38 is provided within the volume defined by deforming portions of a sheet of metal which define a passageway therein of the type hereinabove described. The panel structure 30 includes a sheet of metal 31 having a conduit portion 34 provided or formed therein as described and defining a passageway 35 through which a heat transfer fluid may be flowed. Notation 32 refers to flat portions of the sheet 31 disposed between or adjacent to the deformed portions thereof and 33 refers to the flat portion of the sheet aligned with the passageway 35. Lining the interior of the passageway 35 and integrally bonded to the inside surfaces of sheet portions 33 and 34 is an insulating material 36 such as porcelain or other suitable ceramic, thermoplastic or thermosetting resin or the like. For example, the material of layer 36 may comprise any suitable ceramic frit, alumina, boron, etc. Such material 36 may be coated on the inside surface of the conduit 34 after the formation by flowing said material as a liquid through the conduit and solidifying same in situ against the surfaces which it wets. It may also be coated on suitable portions of the original sheets of metal of which conduit panel 31 is originally formed.

Notation 37 refers to that portion of the coating 36 which is disposed against the inside surface of the portion 33 of panel 31 and notation 38 refers to a strip of metal or resistance heating element disposed within layer 37. Resistance heating element 38 may also be integrally bonded to the upper surface of layer 37 or the outer surface of any other portion of the insulating material 36 coating any of the walls of the conduit portion of panel 31.

The panel 30 may be utilized in a number of manners. For example, if element 38 is a resistance heating element, it may be electrically energized and utilized to heat a gas or liquid flowed through passageway 35 and a plurality of such conduit provided in a single sheet of metal may be utilized, if similarly heated, to raise the temperature of a substantially large volume of gas or liquid for heat transfer or chemical reaction purposes. If element 38 embedded in or bonded to the surface of layer 37 of insulating material within the conduit is an electrical conductor connected in an electrical circuit of sufficient energy to substantially heat said element during the conductance of current therethrough, a gas or liquid flowed through passageway 35 may be utilized to maintain the temperature of element 38 substantially constant during its operation.

It is also noted that the structure 30 illustrated in FIG. 3, or modifications thereof, may be utilized to advantage in the fabrication of electrical apparatus such as panel boards, bus-bars, high-power devices and the like. Rapid fabrication of such devices may be effected by means of roll-bonding techniques employing two or more sheets of metal which are selectively coated with insulating material and assembled with one or more conducting strips or bars as illustrated. It is noted that the internally mounted conducting strips 38 are securely maintained within the panel and need no auxiliary insulating means other than the coating 36 disposed against the inside surface of conduit portion 34 of the panel 31. The panel 31 simultaneously provides the conduit portion 34 with excess volume 35 operative to serve as a passageway for coolant fluid and maintain same immediately adjacent the conductor 38. The panel 30 therefore serves a plurality of functions including its use as a support for the conductor 38 and insulation means therefore as well as means for guiding and distributing heat transfer fluid immediately adjacent the conductor during its operation.

Figure 4:
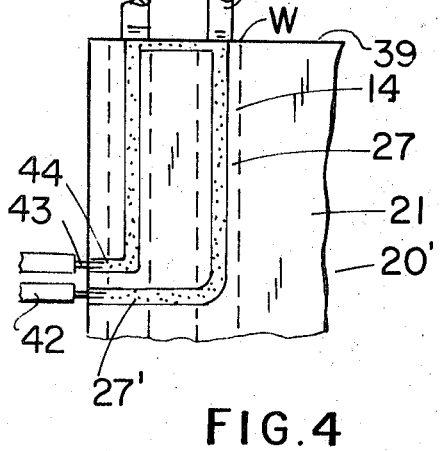
FIG. 4 is a plan view of a fragment of the ducted panel of FIG. 2.

FIG. 4 illustrates a portion of a panel 20' having features of any of the panel structures illustrated in FIGS. 1 to 3. Additional features shown in FIG. 4 include means for connecting to the electrical and fluid conduit means of the panels illustrated in cross section. The sheet 21 is provided with a plurality of fluid conduit portions 14 shown extending parallel to each other and terminating at an edge 39 of said sheet. The deformed wall portions of the conduit portions 14 extend from the blind face of the sheet portion illustrated and their lateral boundaries are illustrated in dashed line notation. Disposed against the face of the sheet which is flat and corresponds, for example, to face 13' of panel member 11 of FIG. 1, are a plurality of electrical conducting strips 27 of the type described and each insulated from the sheet 21. The conducting strips 27 extend parallel to and in alignment with respective of the conduit formations 14 in the sheet 21 and are connected to each other in series. Respective electrical leads 42 have their wires 43 welded or soldered at 44 to respective end portions 27' of the strips 27 for connecting said strips to a source of electrical energy. Each of the two illustrated conduit formations 14 are shown with respective pipes or tubes 40 and 41 secured to the walls of the conduit formations in sealing engagement with the edge portions of the sheet defined by said conduit formations. If conduit formations 27 are interconected further along the sheet, tube 40 may be used as an inlet for fluid to be pumped through the sheet and tube 41 as an outlet form the outflow of fluid from the sheet. Both tubes 40 and 41 may be inlets to respective conduit formations in the sheet if holes or slots are provided in either or both walls of the conduit formations in the sheet 21.

Figure 5:
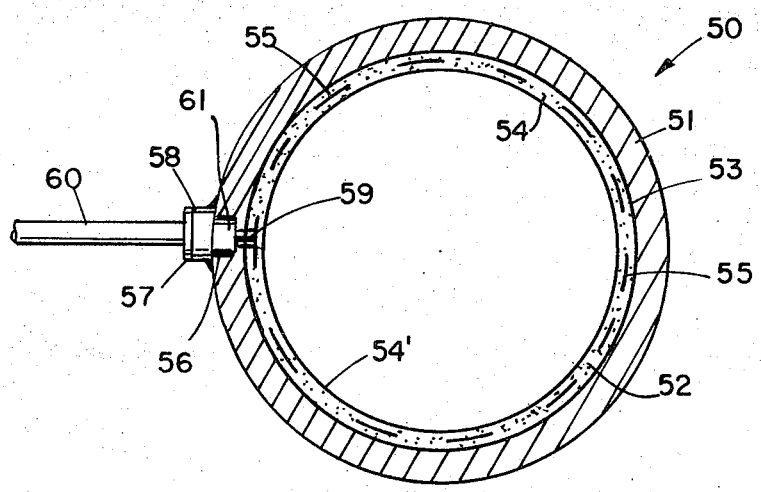
FIG. 5 is a cross-sectional view of a pipe containing structures made in accordance with the instant invention.

In FIG. 5 is shown a modified form of the invention wherein a heat transfer conduit 50 is made of composite materials as described and is in the shape of a cylindrical pipe or tube. The cylindrical wall of the conduit 50 includes an outer wall portion 51 made of metal such as aluminum, copper, steel or other suitable metal. Said outer wall may also comprise a non-metallic material such as a ceramic material, glass or synthetic polymer. Provided against the inside surface of the cylindrical outer conduit 51 is a cylindrical inner conduit portion or formation 52 made of a dielectric material and having embedded therein a plurality of electrically conducting strips 55 which preferably run the length of the pipe 50. The strips 55, in a preferred form of the invention, are electrical resistance heating elements applied to the cylindrical formation 52 of dielectric material during the formation thereof. Accordingly, the cylindrical formation 52 may be fabricated by extrusion or spray coating on the interior surface of the powder cylinder 51 as a plurality of cylindrical layers or strata, a first 53 of which is first disposed against the inside surface of conduit 51 and, after the conducting strips 55 are disposed against the inside surface of the layer 53, layer 54 is thereafter applied over strips 53 and the surrounding dielectric material so as to completely encapsulate the strips within the formation 52 of dielectric material.

The conducting strip formations 55 may be fabricated of any suitable electrically conducting metal or resistance heating material which is applied by one or more techniques including (a) feeding a plurality of preformed formations of said strips against the layer 53 of 52 as or after said layer is applied to the inside surface of pipe 51 by extrusion, spraying, roller coating, fluidized bed means or other suitable technique, (b) extrusion of strips 55 directly on layer 53 or into the total formation 52 as it is extrusion formed, (c) extrusion coating of electrically conducting or resistance heating element material as a plurality of strip formations on the inside surface of layer 53, (d) roller coating of said strips in situ on the surface of layer 53 after which layer 54 is applied thereto, (e) spray coating of the strips onto the surface of layer 53 or applied by other suitable techniques. Notation 54' refers to the inside surface of the conduit 50 illustrated in FIG. 5 which may comprise the surface of the dielectric layer 52 or any suitable material coated thereon. The surface 54' is in direct contact with fluid contained within or conducted by the pipe 50 and, since the conducting strips are in heat transfer relationship with the dielectric material 52, a substantial amount of heat generated thereby will be transferred to the fluid within the pipe for heating same, maintaining same in a fluent or viscous state or the performance of other desirable functions.

In a modified form of the invention illustrated in FIG. 5, a single conducting strip 55 may be encapsulated within the layer 52 and have any suitable width. In other words, the narrow conducting strips may be replaced by one ° extending a substantial distance around the cylinder including one which completely circumscribes the interior volume defined by the surface 54' for transferring heat to the fluid disposed therein.

Also illustrated in FIG. 5 is means electrically connecting a source of electrical energy to one of the conducting strips. Said means includes a connector 57 having a head 58 through which extends a conducting pin 59 which protrudes beyond said head and is connected to a wire 60 which extends from a source of suitable electrical energy. A hole 56 is first drilled through pipe 50 and at least a portion of the dielectric material 52 so as to expose the surface of the conducting strip 55. The connector 57 is then applied above the hole and made to abut the outer surface of pipe 51 with the pin 59 protruding therefrom in abutment with the surface of conducting strip 55. Frictional abutment may be sufficient to cause an electrical connection to be made between pin 59 and strip 55 or other suitable means such as the application of solder, welding or other conducting measn between pin 59 and conductor 55 may be applied to effect a good electrical connection. A portion 61 of head 57 which is made of an insulating material preferably surrounds that portion of the pin 59 which penetrates hole 56 to insulate said pin from the material of outer pipe 51. The head 57 may be frictionally or threadably engaged in the hole 56 or may be welded or bonded to member 51 to retain same in place to effect an electrical and mechanical connection with the pipe 50.

Figure 6:
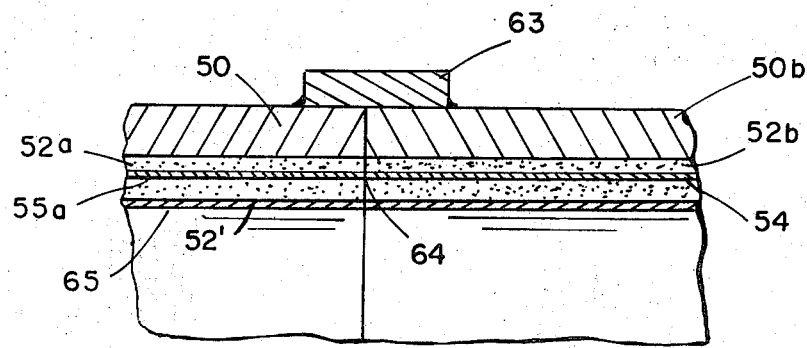
FIG. 6 is a fragmentary view in longitudinal cross-section of a pipe assembly made in accordance with the teachings of the instant invention.

FIG. 6 illustrates a portion of two sections of pipe of the type illustrated in FIG. 5 abutting each other in a manner to effect both a fluid seal at the joint and an electrical connection. A weld ring 63 or other suitable coupling may be applied across the ends of pipe members 50a and 50b to retain same together. In the fabrication of the ends of the pipe, those portions of the dielectric layers 52a and 52b which abut each other may be suitably recessed to receive a circular solder preform 64 or copper ring shown electrically soldered or welded to the conducting strips 55a and 55b of the respective pipe assemblies 50a and 50b. Induction heating may be used to effect the melting or soldering of the circular preform 64 to bond or weld the material thereof to the two conducting strip portions 55a and 55b. In joining the two pipe members 50a and 50b an induction or flame heating tool may be used to simultaneously weld the ends of metal formations 51a and 51b of both pipes and effect electrical connection between conducting strip elements 55a and 55b by melting and soldering or welding the preform 64 to both conducting strips.

Variations in the conduit construction illustrated in FIG. 6 include the provision of a material 65 lining the inside surface 52' of the dielectric material and defining the inside surface of the pipe or conduit. Such lining or coating 65 may comprise, in a preferred form of the invention, a suitable corrosion resistant material such as a polymer of suitable thickness provided to protect the dielectric material from chemical and or physical corrosion or erosion resulting from contact with the fluid carried by the conduit. The material comprising layer or coating 65 may also be a suitable ceramic, glass or metal. If utilized as a metal said material layer 65 may comprise a resistance heating element, conventional electrical energy conductor or electrode. As a heating element, layer 65 may partially or completely coating inside surface of the conduit to provide direct contact heating of fluid in the pipe. As an electrode or conductor, lining 65 may be disposed as one or more bands against the dielectric layer for charging or conducting electrical energy to the fluid in the conduit or effecting a glow discharge therein.

The structural variations and connection means described for FIGS. 5 and 6 may also be applied to the conduits of FIGS. 1–4.

While the hereinabove described dielectric material in or against which said electrically conducting material is secured, is preferably a ceramic material such as aluminum oxide, porcelain enamel, titanium carbide, boron nitride or other suitable ceramic it may also comprise a thermosetting or thermoplastic resin such as silicone, polytetrafluorethylene, urea formaldehyde, polyamide or other suitable resin having a melting point above that at which the electrical conductor thereon is operative.

The illustrated embodiments of the invention which employ an electrical conducting element inside the wall of the fluid conduit may also be modified in one or more forms, viz:

a. The inside surface of the fluid conduit in contact with the fluid carried by the conduit may comprise said electrical conductor or resistance heating element per se which partly or completely lines the inside surface of the conduit as a coating, strips or wires of said conductor. As such, the conductor when connected to a source of electrical energy, may be used to heat the fluid carried in the conduit passageway and/or conduct electrical energy thereto such as for the purpose of exciting the molecules thereof, creating a chemical reaction, charging said fluid, precipitating solids from a liquid, generating a glow discharge in the fluid, etc.

b. A plurality of such conducting strips or wires may be disposed across the conduit bonded within or against the inside wall of the conduit in one or more pairs which are oppositely charged so as to effect an electrostatic charge on the fluid or particles of material in the conduit for charging or electrostatically precipitating same.

c. The dielectric layer provided on the inside of the described fluid conduits may be provided by forming the conduit or pipe or the lining therefore of a metal such as aluminum and anodizing at least the inside surface of said metal by flowing an oxidizing material such as hydrogen fluoride or fluorine gas or other suitable fluid through said conduit to form the fluoride or oxide of the metal as a strate thereof to which said conductor or resistance material is bonded, coated or sprayed as described.

d. In still another embodiment, the fluid carried by the conduit may itself comprise a conducting liquid or gas such as a plasma which is energized by electrical energy conducted thereto by said conducting strips or layers, on the inside surface of the conduit.

e. The conducting material described as lining the conduits may be replaced or supplemented by a semiconducting material or device such as a thermoelectric generator or piezoelectric ceramic material operative to heat, vibrate, cool and/or otherwise affect the fluid carried by the conduit when energized by suitable electrical energy applied thereto.

f. If a plurality of parallel electrical conducting strips such as illustrated in FIG. 5 are encapsulated within or bonded to the inside surface of a dielectric layer inside a conduit or pipe or are encapsulated within the wall of a pipe made of dielectric material such as a polymer or ceramic material, they may be electrically connected together to provide a continuous path for current or pairs of same may be electrically connected together by engaging the ends of said strips at the end of the conduit with a metal ring or conduit which is welded, threaded or otherwise connected to the end of the pipe.

g. The conduit construction illustrated in FIG. 5 may be modified by eliminating the outer cylinder 51 and utilizing a suitable polymer or ceramic for shell 52 to serve as the pipe.

The coatings provided on the interior surfaces of the fluid conduits of FIGS. 3, 5 and 6 may be applied by a number of other techniques with or without the inclusion of said electrically conducting elements for the purpose of rendering the inside surface of the conduit corrosion resistant as well as electrically insulating. For example, the following techniques are herein proposed and form part of this invention:

I. The coating layer 37 or 52 may be provided as a plastic polymer which is deposited in situ against the entire inside surface of the conduit from a molten or solution state. The molten polymer or polymeric solution may be injected through a nozzle or other means disposed in an opening in the conduit and retained within the conduit while a suitable layer thereof solidifies on or deposits in situ on the wall of the conduit whereafter excess liquid material is removed from the conduit or flowed continuously through the conduit and out an opening thereto such as the other end of the conduit while the wall of the conduit is cooled to effect solidification of the polymer closest to the wall until the desired coating thickness has formed thereon after which the flow of polymer is terminated and excess liquid purged from the core volume of the conduit with air or other means preferably injected through the inlet nozzle. Wall thickness control may be effected by proper timing and temperature regulation of the polymer and conduit wall during the process and/or by measuring the thickness of the solidifying material during the coating process such as by means of radiation or ultrasonic detection means and terminating the flow of material or initiating its removal from the conduit when the desired thickness of coating has deposited or solidified thereon.

II. In the application of heat setting coating materials such as thermosetting resins, ceramic materials and the like to coat the described conduits, the walls of the conduit may be heated by induction or radiant heating means or by inserting the conduit pipe or tubed sheet into a hot liquid such as a molten salt bath while the coating material is contained within the conduit to solidify and set same to a desired thickness on the inside surface of the wall of the conduit. The procedure may be effected as described by either completely filling and retaining liquid or particulate coating material in the conduit until the desired portion thereof has set against the heated wall of the conduit or flowing said material continuously through the conduit from an inlet to an outlet thereto while the coating material heat sets against the wall of the conduit and continuing such procedure until the desired coating thickness has been attained. Thereafter, excess coating material is purged therefrom.

III. In another technique, the coating material may comprise a monomer injected into the conduit to fill same per se or continuously flowed through the conduit continuously while a portion thereof is polymerized against the inside surface of the wall of the conduit. Such polymerization may be effected by heating the conduit wall from the exterior thereof, by irradiating said conduit wall and the monomer immediately adjacent said wall or by glow discharge means. Liquid monomers of various known synthetic plastics may be made to fill or flow through the conduit while the exterior of the conduit wall is heated in a manner to polymerize the monomer contacting the inside surface of the conduit wall and/or by directing a beam or beams of high energy radiation such as generated by a source of atomic radiation, Van DeGaff generator or the like against the wall of the conduit from the interior and/or exterior thereof. A monomer vapor may be made to fill or flow through the conduit while an electrode disposed in the central portion of the conduit is energized and generates a so called electron glow discharge to ground defined by the conducting walls of the metal conduit. The glow discharge causes the monomer to deposit and polymerize in situ on the wall of the conduit. The electrode, which may comprise a wire or rod may be slowly moved through the conduit as the monomer therein is flowed or may extend the length of the conduit and deposite the monomer which is polymerized in situ without longitudinal movement of the electrode. Depending on the configuration of the conduit, it may be desireable to predeterminately move the electrode radially within the conduit during the coating procedure such as cause same to scan in a path parallel to the surface of the conduit wall so that the electrode is always closest to a particular strip area of the surface of the conduit on which the monomer is being deposited and polymerized.

IV. In still another technique, the interior and/or exterior surface of the conduit may be predeterminately coated with a ploymer by bringing same into contact with a monomer disposed thereagainst as described or by spraying or dipping said conduit into said monomer and thereafter directing intense radiation against the monomer so coated on the surface of the conduit so as to polymerize said monomer and define a solid coating thereof of desired thickness. The intense polymerizing radiation may be generated by an electron gun or a laser as a beam which beam is predeterminately scanned across the surface or surfaces being so coated and/or the conduit moved with respect to the means generating the radiation to effect the desired results. Accordingly, the laser or electron gun or beam deflection means may be predeterminately moved through the conduit to effect the desired scanning of the monomer disposed against the surface of the conduit and the procedure may be effected during a single or plurality of passes through the conduit or exterior thereof. During such scanning, the monomer may have been previously coated on the wall of the conduit by the means described including flowing, spraying or other means or may be deposited against the area being scanned by flowing or spraying thereon from a nozzle positioned adjacent the radiation source and movable therewith on the same amount so that the monomer is polymerized as or immediately after it is deposited.

Other forms of radiation may be utilized to polymerize the polymer in situ on the surface on which it is deposited such as ultrasonic energy applied to the wall of the conduit and therethrough to the monomer, microwave or radio frequency energy or interrupted, high frequency magnetic fields applied to the conduit from the outside and/or inside thereof.

Reference is made to U.S. Pat. No. 3,278,265 for details of a process for the manufacture of hydrogen fluoride applicable to the described method wherein the surface of an aluminum conduit or coating is converted to aluminum fluoride by the means described for the purposes described above. Such surface layer conversion may be enhanced or speeded up by the simultaneous application of radiant or vibrational energy to the substrate being so converted by the means described above. In other words, a laser, electron gun or other radiant energy generating means may direct its energy as a beam or beams against the surface or surfaces being so converted and/or vibrational energy generated by an ultrasonic transducer coupled to said substrate, intermittent magnetic field generating means or other means may also be used to improve or increase the rate of conversion of the surface strata of said substrate.

Figures 7, 8:
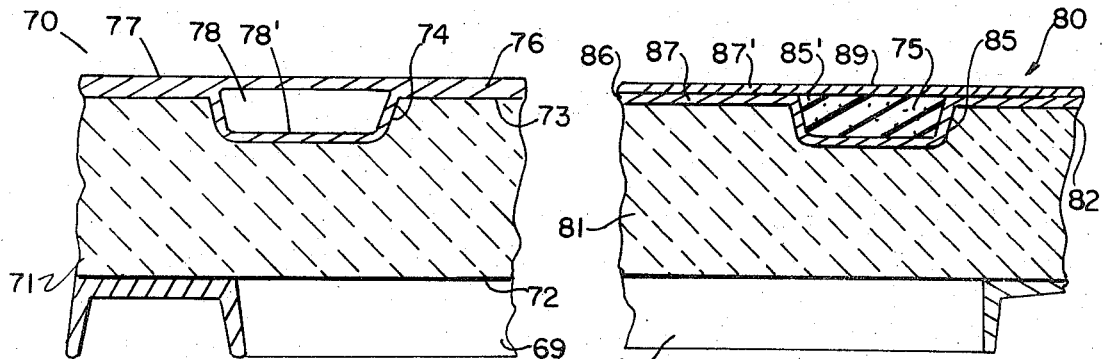
FIG. 7 is a fragmentary view in cross-section of a portion of a composite, heat transfer panel containing features of the inventions.
FIG. 8 is a fragmentary view in cross-section of another form of composite heat transfer panel or container wall.
Figure 9:
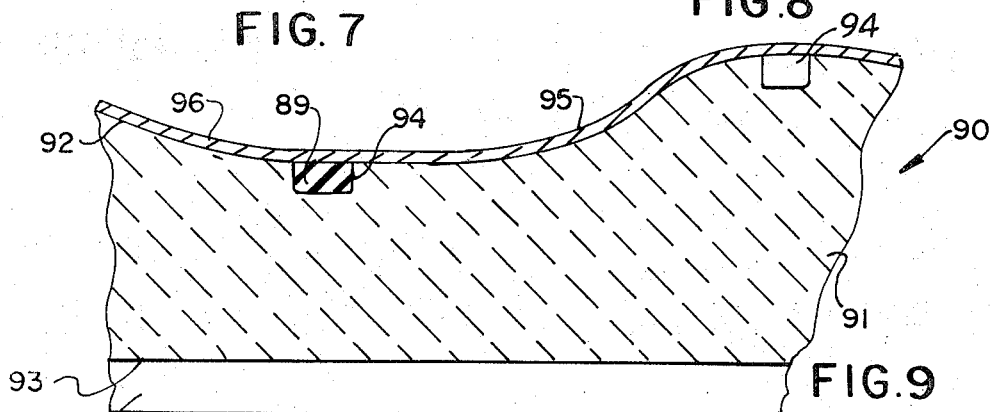
FIG. 9 is a fragmenary view in cross-section of another form of heat transfer panel, mold or container wall made in accordance with the teachings of the instant invention.

FIGS. 7–9 illustrate additional composite material structures applicable in the construction of a variety of machines wherein rapid heat transfer is desired between a wall such as a wall of a mold, furnace or other device and a medium disposed immediately adjacent thereto.

The composite structure 70 of FIG. 7 defines a wall of a furnace, mold or other device composed of a base 71, preferably made of a plastic ceramic or mortar material which has been cast, extruded or otherwise formed to shape having an inner surface 72 and an outer surface 73. Notation 69 refers to a frame or otherwise shaped support for the composite structure 70 which may be secured with fasteners or other means to the surface 73. Secured to and in abutment with the surface 72 of the base 71 is a sheet 76 of metal having a vein-like conduit formation 78 extending from the main portion or base 77 of said sheet. The conduit portion 87 contains a wall 78' which protrudes into a channel 74 formed in the surface 72 of base formation 71. The surface of wall 78' of ducted sheet 76 perfectly abuts the surface 75 of the channel 74 formed in surface 72 of base 71. Notation 79 refers to a passageway extending through the sheet 76 through which passageway a heat transfer fluid may be conducted for either heating the sheet 76 to transfer heat to the material disposed against its outer surface or for cooling same to rapidly dissipate heat conducted thereto by, for example, a working medium or molding material. The sheet 76 may be formed as hereinbefore described and the material forming base 71 may be cast in situ against the surface of sheet 76 or may be preformed and laminated or adhesively bonded to sheet 76.

In one form of the invention illustrated in FIG. 7 the sheet 76 may be made of aluminum, copper, nickel, nickel alloys or titanium while the material comprising base 71 may be composed of portland cement, ceramic material, carbon or other material having sufficient strength to support the structure under the expected operating conditions.

In certain applications, the base 71 may also be made of solid or cellular materials such as cellular ceramics, metals or plastic resins which are cast or otherwise provided in situ against the sheet 76.

In FIG. 8 is shown a structure in the heat transfer panel or container wall which is somewhat similar to the structure of FIG. 7 but is produced by a fabricating technique which is quite different from that illustrated in FIG. 7. The composite structure 80 is composed of a base 81 which is preferably made of a ceramic material such as a cold-setting portland cement or other suitable, relatively low-cost ceramic material which has been cast to shape having an inner surface 82 containing a plurality of channels 84 extending in a circuit about said inner surface to form a heat transfer fluid conducting passageway or network throughout the inside surface of the panel or mold. The outer surface 83 of the composite wall 80 is shown secured to members of a frame 69, wall or otherwise shaped support therefore.

The composite structure 80 of FIG. 8 is formed by first coating or otherwise shaping the base portion 81 forming the major portion of said structure and thereafter disposing a first layer 87 of a lining material 86 such as metal against the inside surface 82 of the material defining base 81. If the lining material 86 is composed of metal, it may be sprayed, vacuum deposited, electrodeposited from a solution or deposited by a suitable electroless metallizing technique.

The first layer 87 of the coating material 86 may be deposited at thickness varying from several thousandths of an inch to 1/16 inch or greater. After it has been deposited, the remaining volumes defining the channels 85 and the coated surface are filled with a material such as wax, lead or other material denoted 89 having a lower melting point than that comprising deposited coating layer 86 and a second layer 87' of the same material comprising layer 87 is deposited, preferably in the same manner in which the first layer was deposited, across the outer surface of the first layer and the surfaces of the material 89 filling the volumes 85'. The second deposited layer 87' therefore becomes integral with the first deposited layer 87 of coating material 86 and provides passageways 75 between the first and second deposited layers which may be cleared of the filler material 89 by melting or dissolving said filler material and causing it to flow out of the confining volume or volumes 85'.

In the structure illustrated in FIG. 7, the shape of the conduit 78 of the composite material is restricted to that shape which the ducted sheet 76 may be pressed or otherwise formed. In this connection, the sheet 76 may be disposed against an irregular outer surface 72 of the base 71 and deformed by the application of fluid pressure to its outer surface 77 to conform to the surface 72.

In the structure illustrated in FIG. 8, the inner surface 82 of the base 81 may be any configuration, as cast or molded, and, since the coating material 86 is deposited by spraying or from the solution, it will naturally conform to the surface on which it is deposited.

In FIG. 9, a composite structure 90 is illustrated which is a modified form of the structures illustrated in FIGS. 7 and 8. The composite 90 is composed of a base 91 which is cast molded or extruded to shape as described and is preferably made of the materials described herein. The inner surface 92 of base 91 is formed with a continuous channel 94 or network of channels which eventually form part of the heat transfer fluid system.

After forming base 91, and supporting its rear face 93 by means of a frame 69 or wall, as described, the channel or channels 94 are filled with a wax 89 to a depth such that, upon applying a coating material 95 to the surface 92 and the outer surface of the wax 89, said coating material will be properly configured with its inside surface 96 having a desired shape or contour. The coating material 95 is applied, as described, by spraying, electrolytically or electroless deposition of metal thereon to a desired depth. After the coating material is so deposited, the wax 89 filling the cavity 94 is heated by applying heat to the composite structure and is caused to flow out of the passageway providing a structure composed of a bulk material defining the main base 91 having a metal liner 92 and a passageway 94 or network of passageways beneath the inside surface of the coating through which heat transfer fluid may be flowed during the application and use of the composite structure as a furnace, mold wall or heat transfer panel.

Certain variations in the structures illustrated in FIGS. 7–9 and their method of manufacture are noted. While the base portions 71, 81 and 91 have been described as composed of ceramic material such as portland cement, or other suitable ceramic which may be cast to shape in a mold or against a preform, they may also be made of suitable polymers such as high temperature plastics or relatively low cost metal such as aluminum. The coating materials defining layers 76, 86 and 95 are preferably metal of relatively high heat conductivity such as aluminum, copper, nickel, steel or other metal which has been sprayed, electrolytically or electrolessly deposited from a solution, fluidically deformed against the surface of base 91 or otherwise deposited. Said coating material may also comprise powdered metal which is sintered in situ on the base material or a high-temperature polymer which has been sprayed or otherwise deposited thereon.

The composite structures illustrates in FIGS. 7–9 may be formed in various shapes such as the shape of a flat curved or irregularly surfaced panel, mold wall member or furnace wall member. Accordingly, means are preferably provided for the admission of a heat transfer fluid to the passageway portions and the exiting or out-flow of said fluid therefrom.

In a particular form of the invention, the filler materials disposed within the passageways 85 to 94 of the structures of FIGS. 8 and 9 may be composed of foamed plastic or other suitable material which is volatized by heat or dissolved to remove it from the passageways as described.

In a preferred method of depositing layer of metal to form the structures of FIGS. 8 and 9, aluminum may be deposited by electroless method employing solvated aluminum hydride in a so-called aluminizing process employing titanium tetrachloride to catalyze the reaction. By this technique, solvated aluminum hydride is coated on the surface which is thereafter exposed to the catalyst, or conversely, the catalyst may be first applied followed by application of the aluminum hydride solution. Pure aluminum will deposit on the surface and may be increased in thickness by the alternate application of the aluminum hydride and catalyst until the desired thickness is deposited.

The use of a catalyst as described above to cause aluminum to deposit on a surface may also be applied to form a coating aluminum on the inside of a conduit or pipe heretofore described in this specification. In other words, where it is desired to coat the inside of a tube, pipe or tubed sheet conduit, made of metal, plastic, ceramic, glass or orther material with aluminum of a desired thickness, the described titanium chloride catalyst and aluminum hydride may be alternately flowed through said conduit to build up an aluminum layer on the inside surface thereof as a plurality of incremental layers which deposit one on the other until the desired thickness is deposited.

Figure 10:
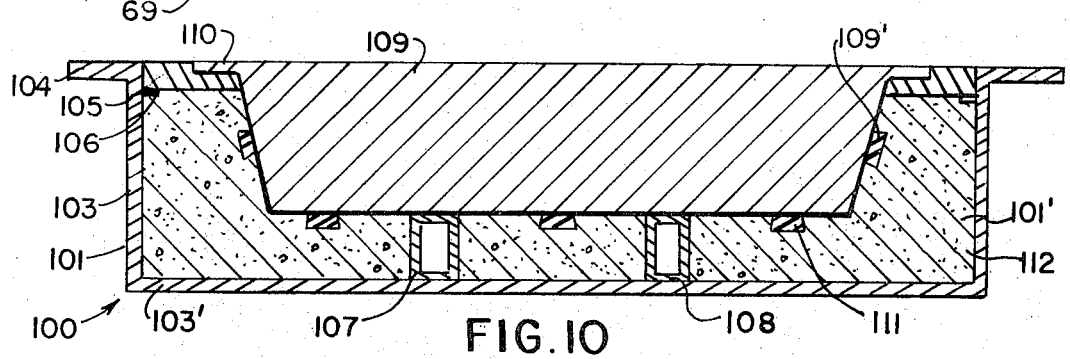
FIG. 10 is an end cross-sectional view of a mold adapted to contain heat transfer conduits adjacent the walls of the molding cavity, the structure being shown during the initial stage of fabrication of the mold.
Figure 11:
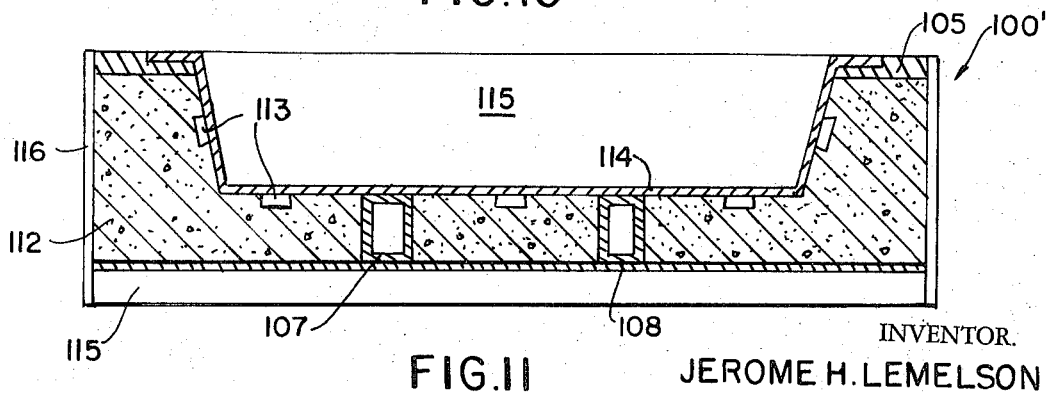
FIG. 11 is an end cross-sectional view of the mold of FIG. 10 after fabrication thereof has been substantially completed.

FIGS. 10 and 11 show steps in the fabrication of a modified type of mold within the purview of this invention. In FIG. 10, a molding assembly 100 is composed of a flanged container 101 made of sheet metal, plastic or other suitable material having a mold form or pattern 109 retained in the central portion of the volume 101' defined by the container 101. The container 101 has a circumscribing side wall or walls denoted 103, a flange 104 at the upper end of the side wall and a bottom wall 103' forming a cavity in which a suitable casting material such as portland cement, concrete, ceramic or other material may be cast about the form 109 which defines, in part, the shape of the molding cavity to be formed. The pattern 109 may be sculptured of wood, plastic, metal or other material and is shown supported by box beams 107 and 108 resting on the bottom wall 103' and by a ring or frame 105 secured by pins 106 which project inwardly from the side walls 103 of the container. The ring 105 supports a flanged portion 110 of the form 109 and centers said form within the container 101 so that casting material 112 may be cast about said form as shown.

The hereinbefore described heat transfer fluid passageways are formed by applying strips 111 of low temperature melting material such as wax to the exterior surface of the pattern or form 109 and bonding said strips in the desired passageway configurations thereto. The strips may be dovetailed in shape as shown so that they will remain in the cast material 112 when the form 109 is removed therefrom after the cast material has set. Thereafter, a suitable lining material 114 such as metal or high temperature plastic or ceramic is deposited against the inside surface of the cast material 112 and the strips 111 by casting, spraying, electrodeposition or electroless deposition in the desired thickness to form a lining defining the molding surface as described. The meltable material 111 filling the cavities or passageways 113 defined between material 112 and lining 114 may be removed by applying a heated fluid to the cavity 115 of the mold so formed and causing the flow of the molten material 111 by applying air under pressure to the end or ends of the passageways 113 to cause said material 111 to be forced out of said passageways. Thereafter the ends of the passageways 113 are connected by suitable fittings and lines to a source of heat transfer fluid including a pump or other means for pressurizing and causing same to flow through the mold, preferably under automatic control during a molding operation.

When the casting material 112 has completely set, and the lining 114 has been applied, the composite structure may be removed from the mold or container 101 and placed in a supporting frame or may be retained in the container 101 as illustrated in FIG. 10 which may be used per se or attached to further means for holding and/or manipulating the assembly during a molding operation. Suitable mold release means may be applied to the outer surface of mold pattern or form 109 during the casting of the mold. If precise dimensioning is required, the shape of the surface 109' of the form 109 is greater in dimensions than the shape of the article to be molded in the completed mold 100' by the thickness of the lining 114 so that the molding cavity 115 will have the precise desired shape after the suitable lining 114 has been provided.

The strips 111 of meltable material may be attached to the surface of the mold form 109 by a suitable adhesive during the casting of the mold. In addition to being made of a suitable wax, the material forming strips 111 may also be made of a low-temperature melting fixturing material such as Rigidax tooling compound manufactured by the M. Argueso Company, Inc. of Mamaroneck, N.Y.

The cast filler material denoted 71, 81, 91 and 112 in the structures shown in FIGS. 7 to 11 may comprise, as hereinbefore set forth, any suitable relatively low cost material as compared to mold forming metals such as Portland cement, various mortars, ceramics and the like. In certain instances, said cast materials may comprise rigid cellular plastics which have been poured into the mold or preform and foamed in situ against the ducted sheet or pattern forming the desired shape. The term 'bulk filler material' as set forth in the claims is thus meant to include such materials as Portland cement, various ceramic materials of know composition which are castable, mortars and cellular plastics, mortars and the like, which are capable of supporting the capping sheets illustrated during the molding operations against said capping sheets.

I claim:

1. In the construction of a mold having a mold cavity into which cavity molten molding material may be charged and solidified to shape, and requiring the transfer of heat to or from the molding material to promote the setting thereof, the improvement comprising:

a mold having a composite mold wall made of first and second materials which are integrally secured to and disposed one against the other, said material comprising a bulk material forming a first pair of said mold and defining a major portion of the mold wherein said first mold part comprises the major thickness of the mold wall, said bulk material having a channel-like identation formed in a surface thereof, support means secured to said first part of said mold for retaining the mold in position, said second material comprising a sheet of metal of substantially constant thickness and having major opposed surfaces one of which major surfaces is in facewise abutment with a surface of said first pair of said mold containing said channel and being supported by said abutting surface, at least a portion of said sheet of metal being concavely shaped with the outer surface of said concavely shaped portion defining at least a portion of a surface of all the cavity of said mold, a fluid passageway extending beneath said outer surface of said metal sheet and defined at least in part by the material of said metal sheet, said fluid passageway conforming to said channel formed in said bulk material and to the cavity wall of the mold and being in heat transfer relationship with the outer surface of said sheet of metal so as to permit the rapid transfer of heat between a heat transfer fluid conducted through said passageway, said sheet of metal and molding material disposed thereagainst in said mold cavity.

2. A mold structure in accordance with claim 1 wherein said channel formed in the outer surface of said first part of said mold defines the shape of the wall of said passageway disposed beneath said sheet of metal.

3. A mold structure in accordance with claim 2 having said passageway defined by sheet material extending into and lining said channel formed in said bulk material.

4. A mold structure in accordance with claim 2 wherein the walls of said passageway are defined in part by said sheet of metal and by the walls of said channel formed in said bulk material.

5. A mold structure in accordance with claim 1 including a further sheet of metal lining the wall of said channel and in sealing abutment with the underside of said sheet of metal defining said second material and the wall of the mold cavity and said passageway extends between the two sheets of metal.

6. A mold structure in accordance with claim 1 wherein said means for supporting said first mold part comprises a container, said container having walls circumscribing and holding the bulk material defining said first part of said mold.

7. A mold construction in accordance with claim 6 including further means disposed within said container and extending through said bulk material for supporting and stiffening the mold.

8. A mold construction in accordance with claim 7 wherein said further means includes at least one tubular member extending through the bulk material and in abutment with the under side of said sheet material, said tubular member having an inlet and outlet to permit the flow of heat transfer fluid therethrough.

9. A mold construction in accordance with claim 1 wherein said bulk material is selected from the group composed of metals, ceramics and cements.

10. A mold construction in accordance with claim 1 wherein said bulk material is composed at least in part of a ceramic material in the form of a casting.

* * * * *